Oct. 14, 1958 E. E. EDWARDS 2,855,780
APPARATUS FOR BOTTOM-HOLE PRESSURE MEASUREMENT
Filed Dec. 16, 1954 3 Sheets-Sheet 2
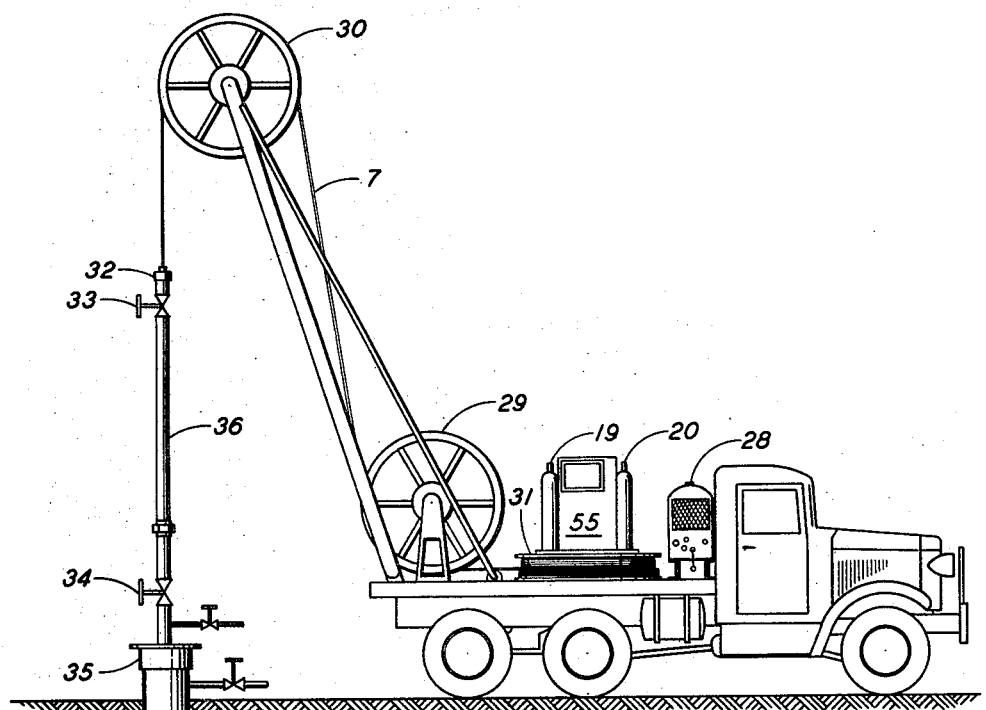
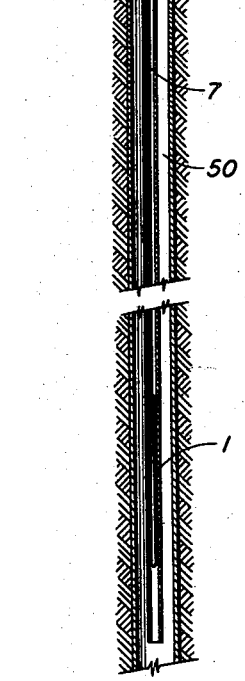
FIG. 2
INVENTOR
Eldred E. Edwards
BY
ATTORNEYS

United States Patent Office 2,855,780
Patented Oct. 14, 1958

2,855,780

APPARATUS FOR BOTTOM-HOLE PRESSURE MEASUREMENT

Eldred E. Edwards, Sebastopol, Calif., assignor to California Research Corporation, San Francisco, Calif., a corporation of Delaware Application December 16, 1954, Serial No. 475,619

6 Claims. (Cl. 73—388)

This invention relates to improved apparatus for determining pressures at various depths in a well bore, more particularly to improved apparatus for determining well pressures by balancing them against pressures exerted by gas columns introduced into the well, and has for an object the provision of simplified apparatus for measuring well pressures by measuring and utilizing the differences in the pressures exerted by at least two gas columns in the well and entirely independent of the temperature existing at any point in the well.

The strong trend in recent years toward improving the efficiency of methods for recovering petroleum from underground reservoirs has greatly increased the necessity for improved methods of determining underground physical conditions. One important underground physical condition, a knowledge of which is of major importance to efficient petroleum production, is well pressure at various depths in both static and flowing wells. Accurate measurements of such pressures can provide information that is of the utmost practical value in solving many petroleum production and oil field development problems. For example, a knowledge of bottom-hole (i. e., reservoir) pressures in static wells can be applied to the determination of the best rate of petroleum withdrawal for most efficient reservoir drainage, the estimation of the changes in contours of certain reservoir surfaces and underlying water surfaces, the quantity of petroleum that should be taken from various portions of the same petroleum unit during a given time in order to maintain hydrostatic equilibrium, etc. A knowledge of bottom-hole pressures in flowing wells can be applied, sometimes in connection with static bottom-hole pressures, to the comparison of the size of producers for proration purposes, the determination of the effective permeability of the producing formation, the determination of flow formulae for use in estimating production decline and well flow life, and for use in flow string design, and the determination of the productivity of successive oil-bearing formations, etc. A knowledge of pressures throughout the length of a producing well can also be applied to flow string design.

Some of the general methods available for determining pressures at various depths within wells are: (1) Balancing well pressure at a given depth against a column of gas, (2) capturing a sample of liquid or gas at a given well depth and transporting it to the surface under its capture pressure, (3) lowering a pressure-sensitive element to a given well depth and electrically transmitting to the surface an indication of the pressure to which it is subjected, (4) lowering a pressure-sensitive element to a given well depth and transmitting the pressure to which it is subjected to the surface through a column of fluid of known density, (5) lowering a self-recording, pressure-sensitive element to a given well depth, withdrawing it, and observing the pressure record.

The operation of applicant's device is an improvement in the first of the foregoing methods and hereinafter referred to as the former method. The former method is useful in connection with a producing well, but generally requires suitable initial modifications of the well casing and production strings to preclude the necessity for shutting down the well during practice of the method. As heretofore practiced, that former method of pressure measurement uses a single, small-diameter capillary tube which is provided with a weighting member and a maximum registering, or recording, thermometer adjacent the bottom end of the tube. The tube then is introduced into a well to the depth where a knowledge of the well pressure is desired, and gas, usually hydrogen, is introduced under sufficient pressure to overcome the hydrostatic well pressure. Flow of gas into the tube is continued until the pressure in the tube is higher than the range within which the expected reading will lie. The gas supply is then shut off. After excess hydrogen escapes from the open end at the bottom of the tubing, equilibrium is reached between the well pressure and the tube gas pressure. The gas pressure at the top of the tube is then read by a suitable pressure gauge, such as a Bourdon tube gauge, or a dead-weight tester. Since the readings are made with a static gas column, no correction is necessary for friction effects, and the only correction of the reading that is necessary is a correction for the weight of the hydrogen column within the tube. The formula for correcting the observed values of pressure to the exact pressure at the bottom of the tubing string has been given by Gill as follows:

$$Pb = Pm + \left[ \left( \frac{0.005599}{144} \right) (D) \left( \frac{Pb + Pm}{2 \times 14.7} \right) \left( \frac{460}{460 + T} \right) \right]$$

where $Pb$ = the actual pressure at the bottom of the string of tubing, in pounds per square inch absolute;
$Pm$ = the pressure measured by the gauge at the surface in pounds per square inch absolute;
$D$ = the depth in feet at which the measurement was made;
$T$ = the average temperature of the gas column in degrees Fahrenheit;
$0.00559$ = the weight of one cubic foot of hydrogen gas at $0°$ F., under a pressure of 14.7 pounds per square inch absolute.

It will be appreciated from the above formula that an accurate knowledge of the average gas-column temperature is indispensable to the succesful practice of the former method. Therefore, a salient disadvantage of the prior art method, especially at high well pressures, is a lack of accurate information of the temperature distribution throughout the capillary tube. As generally practiced, the former method relies upon an approximation of the average gas-column temperature, by averaging the temperature measured at the top of the gas column and the temperature recorded by the maximum recording thermometer at the bottom end of the capillary. This average is at best an approximation, since the temperature gradient throughout the length of the capillary is probably never linear, but varies with the vertical temperature gradient through the well formation. Indeed, the former method is often practiced by estimating rather than calculating an average gas-column temperature due to the problem of measuring temperature at the bottom of the well bore.

An improvement in the determination of well pressures at a given depth in a well is provided which is entirely independent of temperature along the bore hole. In said determination, at least two gas columns, each containing a different gas, are introduced into the well bore, and each column is balanced against the well pressure at the given depth. The well pressure at the given depth is then determined with a high degree of accuracy from the difference in the measured surface pressures of the two gases, without requiring any knowledge of the temperature gradient along the well bore.

Further in accordance with the present invention, there is provided a well pressure-measuring apparatus comprising two concentric tubes for use as gas conduits, said tubes terminating in a steel capsule containing outlets for the two gas conduits, means for balancing the gas in each conduit against well pressure, and means for measuring the pressures at the top of each gas conduit.

These and other objects and advantages of this invention will be further apparent from the following detailed description of a preferred form of apparatus, throughout which description reference is made to the accompanying drawings, in which:

Fig. 2 is a schematic view showing a field setup of the equipment, including truck-mounted apparatus and a vertical section through an oil well, in which the method of the invention is being applied.

As indicated above, heretofore it has been necessary in applying the general method of balancing well pressure at a given well depth against a gas column, to determine said pressure, to know the temperature gradient through the gas column, or to estimate or assume an average gas column temperature. Inasmuch as a knowledge of the exact temperature gradient through a gas column in a well is not practicably obtainable, it has been heretofore necessary, then, to measure the temperature at a given well depth and at the surface, and then to estimate an average gas column temperature on the assumption that a linear temperature gradient existed throughout the gas column.

In practice, it has been found that the assumption of a linear temperature gradient throughout the well bore depth and along the gas column has introduced errors in the determination of the actual pressure at a particular depth in the well bore. Accordingly, the lack of accuracy and reliability of the pressure measurement has seriously affected the ability of petroleum engineers to calculate accurately the best method of recovery of petroleum from the well, since these calculations are quite dependent upon the pressure measurements.

Figure 1:
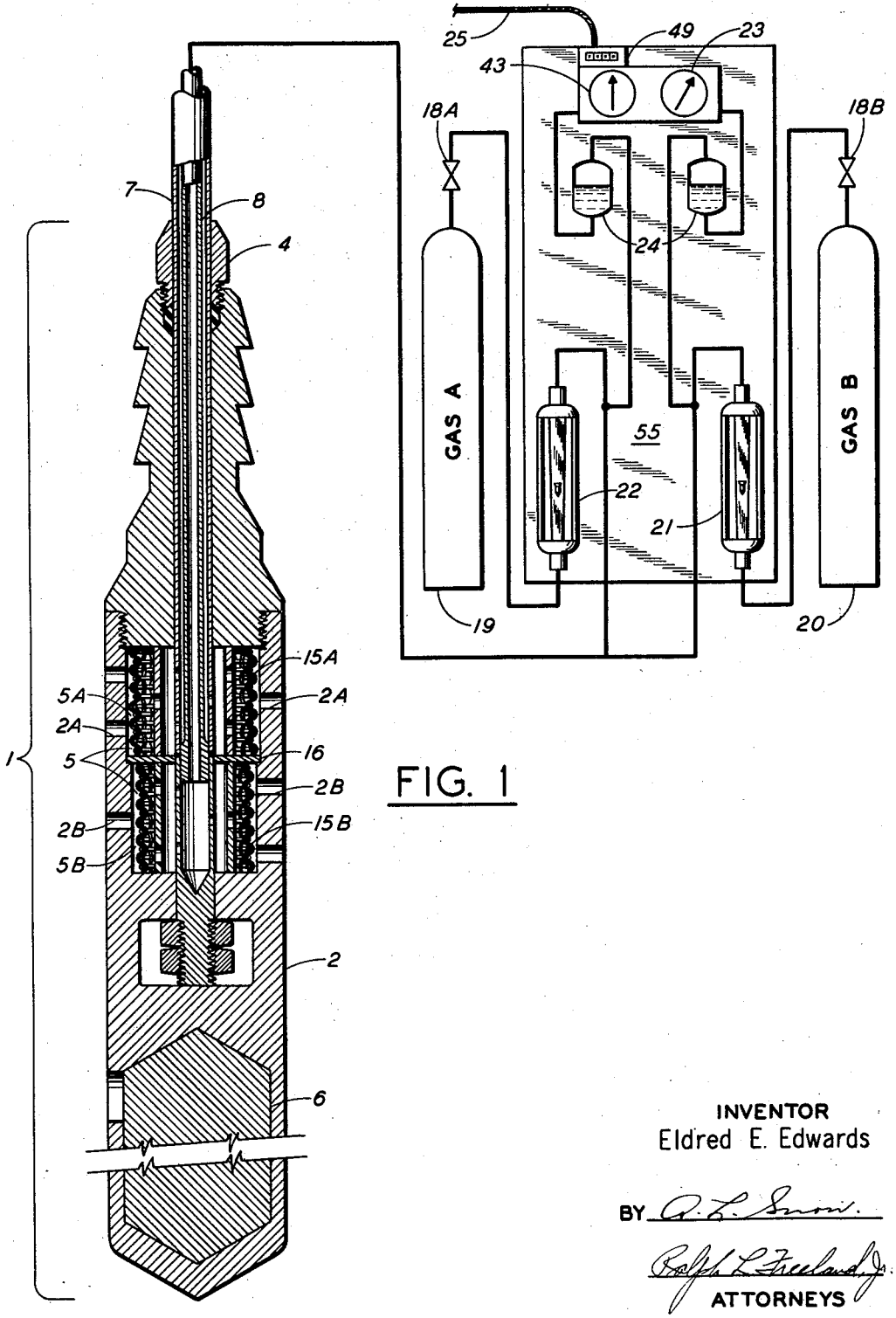
Fig. 1 is a schematic diagram of a gas transmission and pressure-measuring system as contemplated in the practice of the method of this invention.

In accordance with the present invention, there is provided an arrangement for determining the pressure at any given depth in the well bore independently of the temperatures existing throughout the length of the well bore. As illustrated in Fig. 1, a pair of gas columns is arranged to be established through a length of the well bore to the elevation where pressure is to be measured by a pair of elongated conduits or tubings identified as 7 and 8. As particularly shown, the preferred arrangement of said pair of conduits is such that tubing 7 completely surrounds tubing 8 throughout its length, with both lower ends of the tubings being terminated in a head section 2 of a capsule 1, and secured therewithin by a packing nut 4. The dimensions of tubings 7 and 8 are preferably selected so that the circular area within tubing 8 is substantially equal to the annular area within tubing 7 when tubing 8 is surrounded thereby. In one form of apparatus, this relationship has been met by forming outer tubing 7, which establishes one of the gas columns, of 3/16" O. D. x 1/8" I. D. carbon steel, while the other gas column is established by inner tubing 8 formed from 3/32" O. D. x 1/16" I. D. hard-drawn copper.

As more fully illustrated in Fig. 2, the operation of the present invention is performed by positioning capsule 1 at the desired depth in the well bore 50 so that the parallel columns formed by tubings 7 and 8 extend upwardly to different gas supply systems, including the gas cylinders 19 and 20. In accordance with the preferred method of the invention, these gas cylinders contain gases of different molecular weights, for example, helium (He) and hydrogen ($H_2$), each under a pressure of about 8000 p. s. i. Supply containers 19 and 20 are respectively connected to the tubings 7 and 8 through a pressure control and flow-measuring arrangement 55 which includes a pair of rotameters 21 and 22 and corresponding pressure gauges 23 and 43, each operating through seal pots 24.

In accordance with the invention, the two columns of gas whose difference in pressure is to be measured, as an indication of the bottom-hole pressure, are established by coaxial tubings 7 and 8, which are introduced and drawn down into the well bore by weighted section 6 of capsule 1, which aids the several thousand feet of tubing to enter the well head 35 through packing gland 32 of Christmas tree 36, as particularly shown in Fig. 2. Capsule 1 is desirably of relatively small diameter in order that the capsule may be introduced through upper packing gland 32 after lower valve 34 is closed and upper valve 33 opened to admit capsule 1 and the concentric tubings. One method by which the capsule and coaxial tubes may be conveniently transported and utilized in the field is illustrated in Fig. 2, where it will be seen that the concentric tubing may be wound and stored on a large-diameter drum 31 about 6 to 10 feet in diameter. For the purpose of inserting or withdrawing the tubing from the well, the tubing is passed over a pair of sheaves 29 and 30, which may be of a diameter similar to drum 31. The entire lowering and elevating arrangement, as shown, may thus be readily transported by truck and operated by a hoisting engine 28.

The manner in which the two parallel columns of gas are terminated at the desired location in the well is shown in Fig. 1. As there illustrated, tubes 7 and 8 end in a pair of adjacent chambers identified, respectively, as 5A and 5B, which are separated by baffle 16. Each of the chambers 5A and 5B are preferably provided with screens 15A and 15B, respectively, through which the pressure of the gas column may communicate with the well bore by way of ports 2A and 2B, respectively, formed in the wall 2 and capsule 1. As contemplated by the present invention, the ends of both tubes 7 and 8 are in free communication with the fluid in the well bore through screens 15A and 15B which prevent particulate material from entering tubes 7 and 8 through ports 2A and 2B. As shown, each of the columns is terminated closely adjacent to each other so that substantially the same hydrostatic pressure in the well bore will be balanced against both gas columns.

During the operation of the pressure-measuring system, the two parallel conduits are desirably introduced with an initial pressure being exerted through lines 7 and 8 by the gas cylinders 19 and 20 so that well liquids will not rise within the tubing through openings 2A and 2B in capsule 1. After capsule 1 has been lowered to the desired depth, as measured by depth indicator 49 (Fig. 1) which is driven by hoisting drum 31 through flexible drive shaft 25, the pressure on both lines is gradually increased through the further opening of valves 18A and 18B, which supply compressed gas to lines 7 and 8, respectively, through rotameters 21 and 22, respectively. The pressure required to force gas to flow through the two tubings 7 and 8 is registered by the pressure gauges 23 and 43. If liquid has resin in either of the tubings 7 and 8, the pressure gauges 23 or 43 will indicate an increase in pressure until the gas expels liquid from its tubing. This increased pressure will continue until gas escapes from the lower end of the tubing, at which time the pressure gauges will indicate no further rise in pressure. Accordingly, when the indication on both pressure gauges has risen to maximum, both tubing 7 and tubing 8 will be filled with gas down to their respective termination points in chamber 5, separated into upper and lower chambers 5A and 5B by baffle plate 16.

When tubing 8 and the annular space between tubings 7 and 8 are each filled, respectively, by a gas of a different molecular weight, the gas supply to each tubing may be shut off by turning valves 18. Alternatively, valves 18A and 18B may be adjusted until rotameters 21 and 22 indicate that both hydrogen and helium, respectively, are escaping in a slow trickle and at an equal rate from capsule 1. It will be apparent that gauges 23 and 43 will then indicate the pressures at the tops of the columns of hydrogen and helium, respectively. It will also be apparent that the gauge pressure at the top of each column, plus a correction for the weight of the gas column, will be equal to the pressure existing at the bottom of the column, i. e., to the pressure in the well at the depth at which capsule 1 is located.

As has been pointed out before, the pressure of either gas column alone in the well from the desired depth to the source cannot be calculated from the indicated pressure at the top of the gas columns, unless the temperature gradient through the gas column is known. However, in accordance with the present invention, it will now be shown that by the use of the two pressures at the top of the two gas columns, the pressure in the well at the desired depth can be calculated using the molecular weights and gas law deviation factors for each gas without the necessity for knowledge of any temperatures along the well whatsoever.

These calculations may be made as follows for the specific case where helium and hydrogen are the gases.

Letting:

$P_A$ and $P_B$ = the pressures indicated at the tops of the columns of hydrogen and helium, respectively;

$\rho_A$ and $\rho_B$ = the density of hydrogen and helium, respectively;

$Z_A$ and $Z_B$ = the gas law deviation factors for hydrogen and helium, respectively;

$M_A$ and $M_B$ = the molecular weights for hydrogen and helium, respectively;

$T$ = the gas temperature (the same for any gas at any given depth);

$R$ = the universal gas constant;

$P_1$ = the pressure at the well depth at which capsule 1 is located;

$h$ = the distance from the gas outlets in capsule 1 up to any point in the columns of hydrogen and helium gas;

$H$ = the depth in the well at which capsule 1 is located.

Then:

(1) $$dP_A = -\rho_A dh = \frac{P_A M_A}{Z_A} \frac{dh}{RT}$$

(2) $$dP_B = -\rho_B dh = \frac{P_B M_B}{Z_B} \frac{dh}{RT}$$

Integrating from the bottom to the top of the gas columns:

(3) $$1nP_1 - 1nP_A = \frac{M_A}{Z_A} \int_0^H \frac{dh}{RT}$$

(4) $$1nP_1 - 1nP_B = \frac{M_B}{Z_B} \int_0^H \frac{dh}{RT}$$

Then, eliminating $$\int_0^H \frac{dh}{RT}$$

(5) $$1n\left(\frac{P_1}{P_A}\right) = \frac{1}{\left(\frac{M_B}{M_A}\right)\left(\frac{Z_A}{Z_B}\right)^{-1}} 1n\left(\frac{P_A}{P_B}\right)$$

Let $$\frac{1}{\left(\frac{M_B}{M_A}\right)\left(\frac{Z_A}{Z_B}\right)^{-1}} = C$$

Then (6) $$1nP_1 = 1nP_A (C+1) - 1nP_B$$

Therefore, it will be seen that by a direct application of Equation 5, the pressure $P_1$ at the well depth at which capsule 1 is located can be calculated. It is well known that the molecular weight $M_A$ of hydrogen equals 2.016 and the molecular weight $M_B$ of helium equals 4.003. Values of $Z_A$ for hydrogen may be found in Perry's Chemical Engineering Handbook, and values of $Z_B$ for helium may be computed from an equation of state given in A. S. M. E. Paper No. 49–A96 (published in August 1950, A. S. M. E. Transactions). With these two standard gases, the pressure indicating gages, such as 23 and 43 in Fig. 1, can be calibrated to measure directly pressure $P_1$ at the given depth.

It will be obvious that it is possible to eliminate the temperature factor from Equation 5 above, because the use of two gas columns, each containing a gas of a different molecular weight and each having the same temperature at any given depth in the well, makes it possible to cancel out the common temperature term.

From the foregoing description, it will be seen that the described embodiments and methods of calculation make it possible to determine with a high degree of accuracy the pressure existing at any given depth in a well without knowledge of the temperature gradient through the well and without recourse to any temperature determination whatsoever.

While the preferred embodiment of the present invention, as illustrated and described, utilizes a pair of concentric tubes, it will be apparent that any arrangement of parallel tubes may be utilized, and, with proper calibration of the gauges and molecular weights of the gases, the readings obtained by the pressure gauges may be made to indicate directly the true bottom-hole pressure. It will be further apparent that the present invention may be practiced with a single tube by the utilization of two different columns of gas, each successively introduced into the well by purging the first gas from the single tube before the second gas is introduced. This may be done by the simple expedient of forcing one gas out by introducing the second gas, but preferably compressed air of suitable pressure is forced through the tubing between the successive introduction of two gases of different molecular weights, such as helium and hydrogen, to prevent mixing of the two gases. Accordingly, it will be seen that a simple throttling valve means, such as valve 18, will provide a method of operating the gas flow system to introduce selectively either gas into a single tube, or both gases simultaneously into a pair of parallel tubes.

Figure 3:
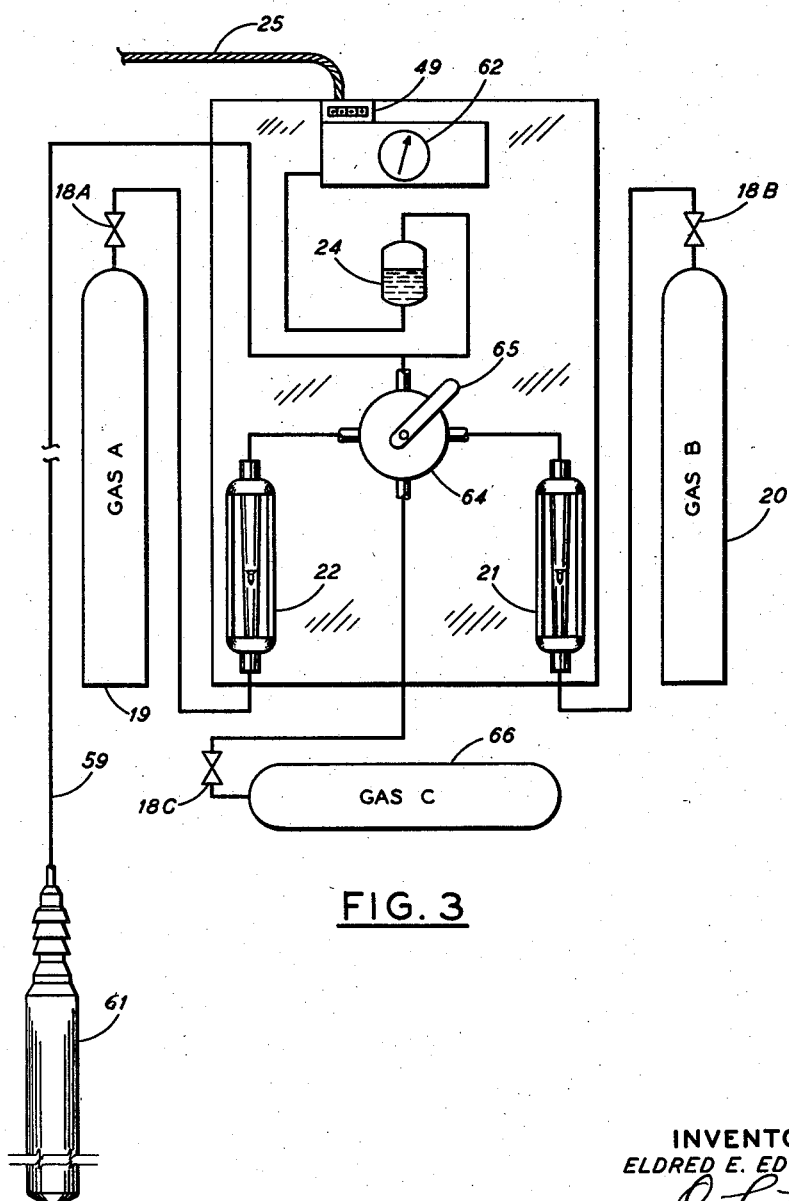
Fig. 3 is a schematic diagram of an alternate form of gas transmission and pressure-measuring system as contemplated in the practice of the method of this invention.

Fig. 3 illustrates an embodiment of this invention in which a single tube is used, as described above. In this modification, capsule 61, similar to capsule 1 except constructed for a single tubing, is positioned to the desired depth so that a single tubing 59, having an open end in capsule 61 in communication with the well bore, forms a column extending upward to pressure gage 62 through seal pot 24 and to selector valve 64. Selector valve 64 is so arranged that it may be operated by handle 65 to alternately connect gas cylinders 19, 66 and 20 with tubing 59. The gases in cylinders 19 and 20 are identical with those used in connection with the embodiment shown in Fig. 1. The gas in cylinder 66 is a purging gas, preferably compressed air, under a pressure of about 8000 p. s. i. In operation, with valves 18 closed, handle 65 of four-way valve 64 is turned to select the gas from cylinder 19. Valve 18A is then opened, and gas from cylinder 19 is allowed to enter tubing 59 until pressure gage 62 indicates a maximum pressure, in the same manner as the embodiment shown in Fig. 1. This pressure is noted or recorded, valve 18A is closed, and handle 65 of valve 64 is turned to select the purging gas from cylinder 66. Valve 18C is then opened sufficiently and for a sufficient length of time to allow the gas from cylinder 66 to completely purge tubing 59. If necessary to insure complete purging, cylinder 66 may be provided with a meter that will indicate the quantity of purging gas that has entered tubing 59. Following purging of tubing 59, valve 18C is closed, and the same operation used in connection with the gas in cylinder 19 is followed with the gas in cylinder 20; the maximum pressure indicated by gage 62 again is noted or recorded. With the difference in maximum pressures from the successive use of two columns of gas of different molecular weights, the well pressure at the depth at which capsule 61 was located is calculated in the manner previously outlined in connection with the embodiment shown in Fig. 1.

Although only one specific arrangement and mode of construction has been described and illustrated, it is obvious that numerous changes could be made in the materials disclosed herein without departing from the substance of the invention, and all such changes which fall within the scope of the appended claims are intended to be embraced thereby.

I claim:

1. Apparatus for determining the pressure at any given depth in a well bore comprising means for introducing into the well bore from the surface thereof to said depth two concentric capillary tubings, said tubings being separated by an annular space having a cross-sectional area substantially equal to the cross-sectional area of the bore through the inner tubing, means including a source of gas under greater pressure than the well bore pressure at said depth for forcing a column of said gas through said annular space to dispel all fluid from said space, means including a source of dissimilar gas under greater pressure than the well bore pressure at said depth for forcing a column of said dissimilar gas having a different molecular weight through the bore in said inner tubing to dispel all fluid from the inner tubing, separate pressure measuring means at the top of each of said columns for detecting when all fluid has been dispelled by said columns from both said annular space and said inner tubing so that the gas pressures at the lower ends of each of said columns are in equilibrium with the well bore pressures at said depth, and for providing by the difference in the pressures they indicate during said equilibrium an indication of the pressure at said depth.

2. Apparatus for determining the pressure at any given depth in a well bore comprising at least a pair of conduits, each adapted to extend from a compressed gas source to said depth, a source of compressed gas for each conduit under greater pressure than the well pressure at said depth, said sources containing gases of different molecular weights, separate pressure-measuring means for measuring the gas pressure at the top of each conduit, and means for measuring the depth in the well bore to which said conduits extend, the pressures indicated by said pressure-measuring means, by reaching stable values, showing when the lower ends of the columns of gas forced into said conduits from said sources have dispelled all liquid from said conduits to said depth and the gas pressures at said lower ends are in equilibrium with the well bore pressure at said depth.

3. Apparatus for determining the pressure at a predeterminable depth in a well bore independent of the temperature gradient along said well bore comprising open-bottomed tubing means extending from the earth's surface to said predeterminable depth, a first separate source of a first gas of known molecular weight under pressure, means for forcing said first gas into said tubing means to the open bottom thereof, whereby a first gas column consisting of said first gas only is formed, and whereby equilibrium of pressure is established at said bottom between said first gas and the well pressure at said depth, a second separate source of a second gas of a different molecular weight under pressure, means for forcing said second gas into said tubing means to the open bottom thereof, whereby a second gas column consisting of second gas only is formed, and whereby equilibrium of pressure is established at said bottom between said second gas and the well pressure at said depth, and means at the top of said tubing means responsive to gas pressure therein for measuring the difference in pressure of the first and second gases at the earth's surface as an indication of the pressure at said depth, and for indicating when said first and second gases have reached the open bottom of said tubing means.

4. Apparatus in accordance with claim 3, including means for selectively operating said means for introducing said first gas and means for introducing said second gas into said tubing means to successively measure the pressure at the earth's surface required to establish equilibrium with the pressure at said depth of said well bore, and said tubing means comprising a single tube connected to said selectively operable means.

5. Apparatus in accordance with claim 3, in which said tubing means comprises at least two different conduits for simultaneously introducing said first and second gases into said well bore and said measuring means includes means for simultaneously indicating the difference in pressures existing in said different conduits.

6. Apparatus for determining the pressure at any given depth in a well bore, comprising means for introducing into the ground from about the ground surface to said depth two conduits, the lower end of each being open at said depth, means for measuring the depth to which said conduits are introduced, means for forming a gas column in each of said two conduits from about the ground surface to the open lower end thereof, whereby all well fluids are dispelled from each of said conduits and whereby the lower end of each gas column is in communication with and balanced against the well pressure at said depth, each gas column consisting of a gas of a different molecular weight, and a means at the top of each gas column for providing an indication of the pressure at said top, said indication by reaching a stable value when gas is forced from the open lower end of the conduit surrounding the gas column being measured showing that the lower end of said gas column being measured has dispelled all liquid from said conduit and is in equilibrium with the well bore pressure at said depth, the difference in the indicated pressures being a measure of the pressure at said given depth in the well bore.

References Cited in the file of this patent
UNITED STATES PATENTS
2,360,742    Toth et al. _____ Oct. 17, 1944